United States Patent
Teegan et al.

(10) Patent No.: US 7,747,567 B2
(45) Date of Patent: Jun. 29, 2010

(54) SEPARATION OF CONFLICT RESOLUTION FROM SYNCHRONIZATION

(75) Inventors: Hugh A. Teegan, Bellevue, WA (US); David P. Limont, Seattle, WA (US); Quentin S. Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 11/324,079

(22) Filed: Dec. 30, 2005

(65) Prior Publication Data

US 2007/0162517 A1   Jul. 12, 2007

(51) Int. Cl.
*G06F 7/00* (2006.01)

(52) U.S. Cl. ...................... 707/610; 709/203
(58) Field of Classification Search ........... None
See application file for complete search history.

(56) References Cited

U.S. PATENT DOCUMENTS

| | | | |
|---|---|---|---|
| 2005/0177617 A1* | 8/2005 | Banginwar et al. | 709/203 |
| 2006/0020359 A1* | 1/2006 | Wu | 700/104 |
| 2008/0016464 A1* | 1/2008 | Gao et al. | 715/825 |

OTHER PUBLICATIONS

Synchronization conflict resolution. http://publib.boulder.ibm.com/infocenter/weahelp/topic/com.ibm.websphere.db2e.doc/dbcssc0206.html. Last accessed Apr. 3, 2006.
Getting Started with Date Synchronization Using SyncML. http://developers.sun.com/techtopics/mobility/midp/articles/syncml/. Last accessed Apr. 3, 2006.

* cited by examiner

*Primary Examiner*—Charles Rones
*Assistant Examiner*—Belix M Ortiz
(74) *Attorney, Agent, or Firm*—Woodcock Washburn LLP

(57) ABSTRACT

The subject disclosure pertains to separation of conflict resolution from a synchronization system or methodology. Upon detection of a synchronization conflict, a request can be generated by a synchronization component and transmitted to a conflict resolution component that is independent and detached from one or more synchronization components. The conflict resolution component resolves the conflict, generates a resolution response, and transmits the responses back to the requesting synchronization component for implementation, among other things.

14 Claims, 12 Drawing Sheets

SEPARATION OF CONFLICT RESOLUTION FROM SYNCHRONIZATION

BACKGROUND

Individuals these days employ myriads of computer devices or systems on a regular basis. For example, individuals can have a desktop computer and/or associated file server with which they interact at work. They can also have a laptop computer for working away from the office as well as one or more desktop computers at home. Furthermore, they may have palm-top computers such as a personal digital assistant (PDA), pocket PCs, mobile phones and/or other portable devices they utilize for organizational, communication, and/or entertainment purposes. It is typically desirous for at least some data to be copied to multiple devices to enable convenient access thereto. For instance, often a user copies files from a desktop computer or file server to a portable computer or device for use while the user is away from their office. The user then likely modifies or adds some new files while away from the office and subsequently needs to copy these files to their desktop computer or file server when they return to the office. Similarly, users may wish to copy pictures or music from one device to another (e.g., computer to MP3 player, digital camera to computer . . . ). Still further yet, users may demand that personal preferences and contacts (e.g., address book) be maintained across all or a subset of their computers. Thus, certain files need to be synchronized across multiple computers or devices.

In its simplest form, synchronization is merely the task of causing designated files from multiple devices or systems to become the same or consistent. Typically, this means that the most up to data file versions are used to copy to a store. This process is automated by two-way, peer-to-peer, synchronization software applications. In particular, upon activation, a synchronization application can detect file changes or additions on a first device and copy or replicate new and/or altered files to a second device communicatively coupled to the first device, for instance via a hardwired or wireless connection. This causes the files on the first device to be synchronized with files on the second device. Synchronization can also be performed remotely by accessing a network having a first device such as desktop computer coupled thereto. A second device such as a second desktop computer or laptop computer can be synchronized with the first device utilizing synchronization software.

Periodically conflicts can occur during a synchronization process. In one instance, a conflict can arise when changes to a file and replica are made with multiple synchronization devices. For example, a conflict can occur if a user enters one value for a spreadsheet field on desktop and later enters a different value for the same field on a laptop. When these devices are synchronized, conflicts are detected and subsequently resolved. Conventional conflict resolution schemes rely on one of the parties to synchronization acting as master or primary for conflict resolution and the other party to act as slave or secondary with various other factors such as timestamps and general policies being taken into account at the behest of master.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described the subject innovation pertains to independent synchronization conflict resolution. In accordance with an aspect of the subject innovation, a conflict resolution component is provided that is external or separate from synchronization components or entities. Accordingly, any synchronization party can appeal to the component for resolution. Furthermore, the resolution policy applied by the conflict resolution component can be independent of conflicting parties.

According to another aspect of the subject innovation, synchronization components, entities or parties are modified to support external conflict resolution. For example, upon detection of a conflict a request for resolution can be generated and communicated to the conflict resolution component. Subsequently, a resolution response can be received from the conflict resolution component and employed in applying changes and generating a set of changes to communicate to one or more other synchronization components.

The provided systems and methods do not exclude the use of conventional native conflict resolution components. In fact, according to yet another aspect of the innovation, synchronization components can employ either a native or an independent resolution component based upon a selection received, retrieved, or determined by a synchronization component or device.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
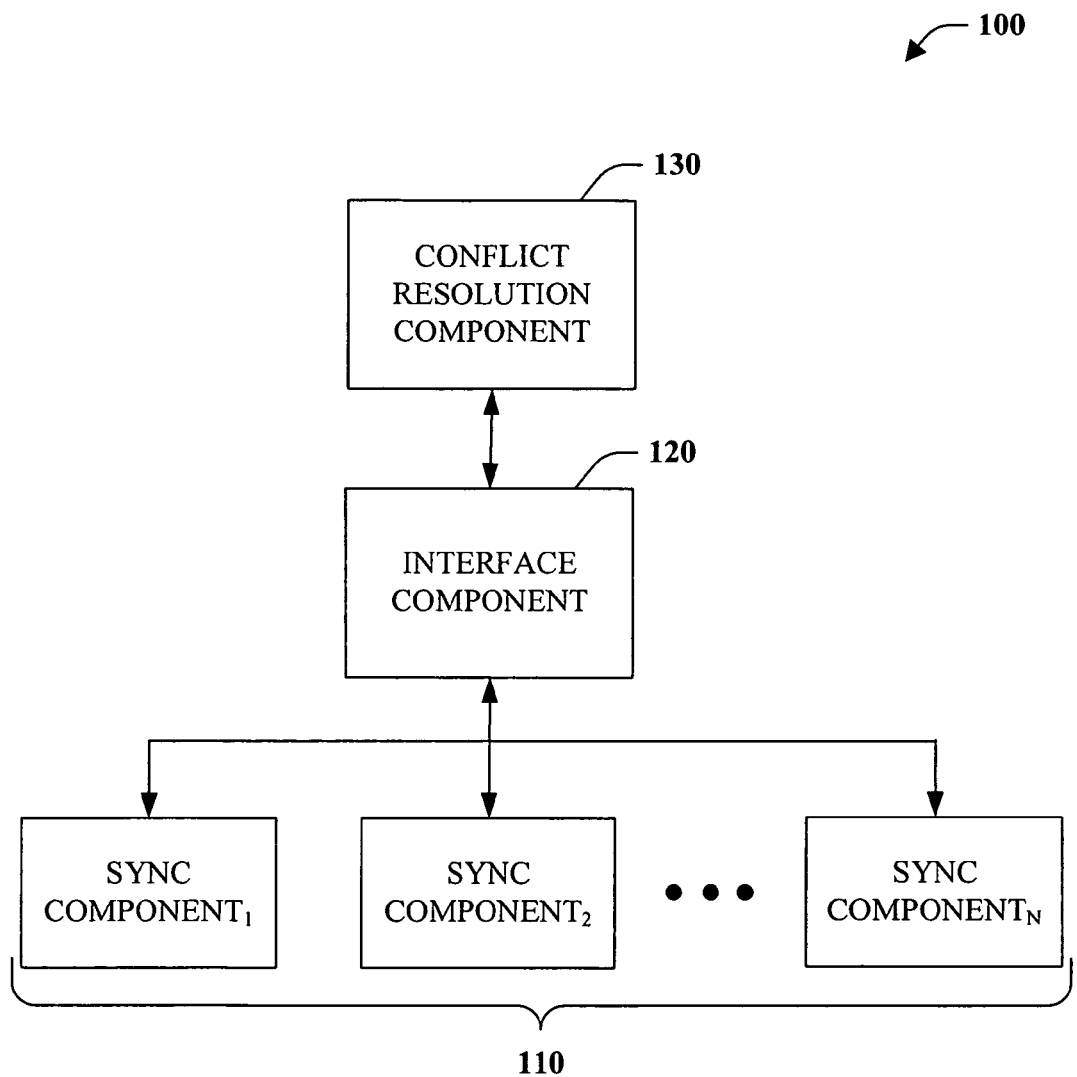
FIG. 1 is a block diagram of a conflict resolution system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Artificial intelligence based systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, a conflict resolution system 100 is depicted in accordance with an aspect of the subject innovation. The system 100 includes a plurality of synchronization components 110 (Synchronization component$_1$ through synchronization component$_N$, where N is an integer greater than one), an interface component 120 and a conflict resolution component 130.

Synchronization components 110 include entities or items that are to be synchronized with one and other. By way of example and not limitation, synchronization items can correspond to documents such as word processing and spreadsheet documents as well as email messages, contacts, and/or calendar items. Synchronization of components 110 corresponds to causing designated components, entities or items from multiple devices or systems to become the same or consistent. The synchronization components 110 are communicatively coupled together to enable communication there between. For instance, a first synchronization component 110 can initiate synchronization via a synchronization request that includes the first component 110 state and a set of zero or more changes that occurred after the last synchronization. A second synchronization component 110 can received the request and information and subsequently generate or enumerate a set of changes that occurred with respect to the second component 110 after the last synchronization. The second synchronization component 110 can then attempt to apply the changes and transmit a response to the first synchronization component 110 including the state and a set of zero or more changes. However, during application of the changes a conflict may be detected by the second synchronization entity 110. For instance, a document could have been changed on the server as well as a mobile device after the last synchronization. This results in a synchronization conflict concerning which, if any, changes should be applied. Such conflicts can be resolved or otherwise aided by a conflict resolution component such as component 130 via interface component.

Conflict resolution system 100 also includes interface component 120. The interface component 120 is communicatively coupled to the synchronization components 110 and the conflict resolution component 130. The interface 120 enables communication to occur between the synchronization components 110 and the resolution component 130. For instance, the interface component 120 can receive a conflict resolution request from a synchronization component 110 and return a response to the synchronization component 110 from the conflict resolution component 130.

Conflict resolution component 130 resolves or facilitates resolution of synchronization conflicts. The conflict resolution component 130 is communicatively coupled to the interface component 120 and is operable to receive synchronization requests from one or more of the synchronization components 110. The resolution request can include, among other things, identities of the conflicting components 110 as well as state or version information that describes what each of the components 110 knows. Upon receipt of such request, the conflict resolution component can execute a conflict resolution protocol or policy, which specifies and ultimately determines how a conflict is resolved. For instance, the policy could indicate that the synchronization component with the most recent timestamp win over a component with an earlier timestamp. The conflict resolution component 130 could thus identify timestamps associated with the component and choose the most recent as the winner. After a decision is made concerning how the conflict is to be resolved, the conflict resolution component 130 can identify the changes that one or more synchronization components 110 should make to resolve the conflict. These changes can be included in a resolution response generated by the conflict resolution component 130 and communicated one or more synchronization components 110 via interface 120.

Separation of the conflict resolution component 130 from synchronization mechanisms or protocols of individual synchronization components 110 has myriad advantages. First, by enabling conflict resolution to occur anywhere any number of computers or machines enables smaller devices to take advantage of better conflict resolution protocols that may not otherwise be able to be executed efficiently. For example, where the synchronization components are mobile phones, personal digital assistances (PDAs), cameras, and/or calculators or the like, conflict resolution can be outsourced to a system with more processing power rather than by one of the devices. Further yet, more complex conflict resolution can be employed with respect to any synchronization devices at least because device processing power would not be required. More dynamic and adaptive resolution policies can also be employed as the polices are independent of the devices involved. For instance, a resolution policy can be utilized that is adapted to a particular user, user data, time of the day and the like. In other words, the resolution component can take advantage of more context information outside devices to be synchronized.

Moreover, conflict resolution can be specified and employed with respect to synchronization components 110 that would not otherwise be able to be synchronized by conventional mechanisms. For example, suppose a user has two different calendar applications, a first and second, that they would like to synchronize or aggregate. For instance, the first calendar application can be a work calendar and the second a personal calendar. One would not expect that the first calendar application would know how to resolve its calendar items with respect to the second calendar application items. Similarly, it is unlikely that the second calendar application would be able to resolve its items with the calendar items of the first calendar application. However, by designing the conflict resolution as a separate entity, both applications can appeal to the conflict resolution component 130 to resolve the conflict. Furthermore, the conflict resolution could, in one exemplary scenario, provide precedence to the first calendar application during business hours, but give precedence to the second application after business hours and on weekends.

Figure 2:
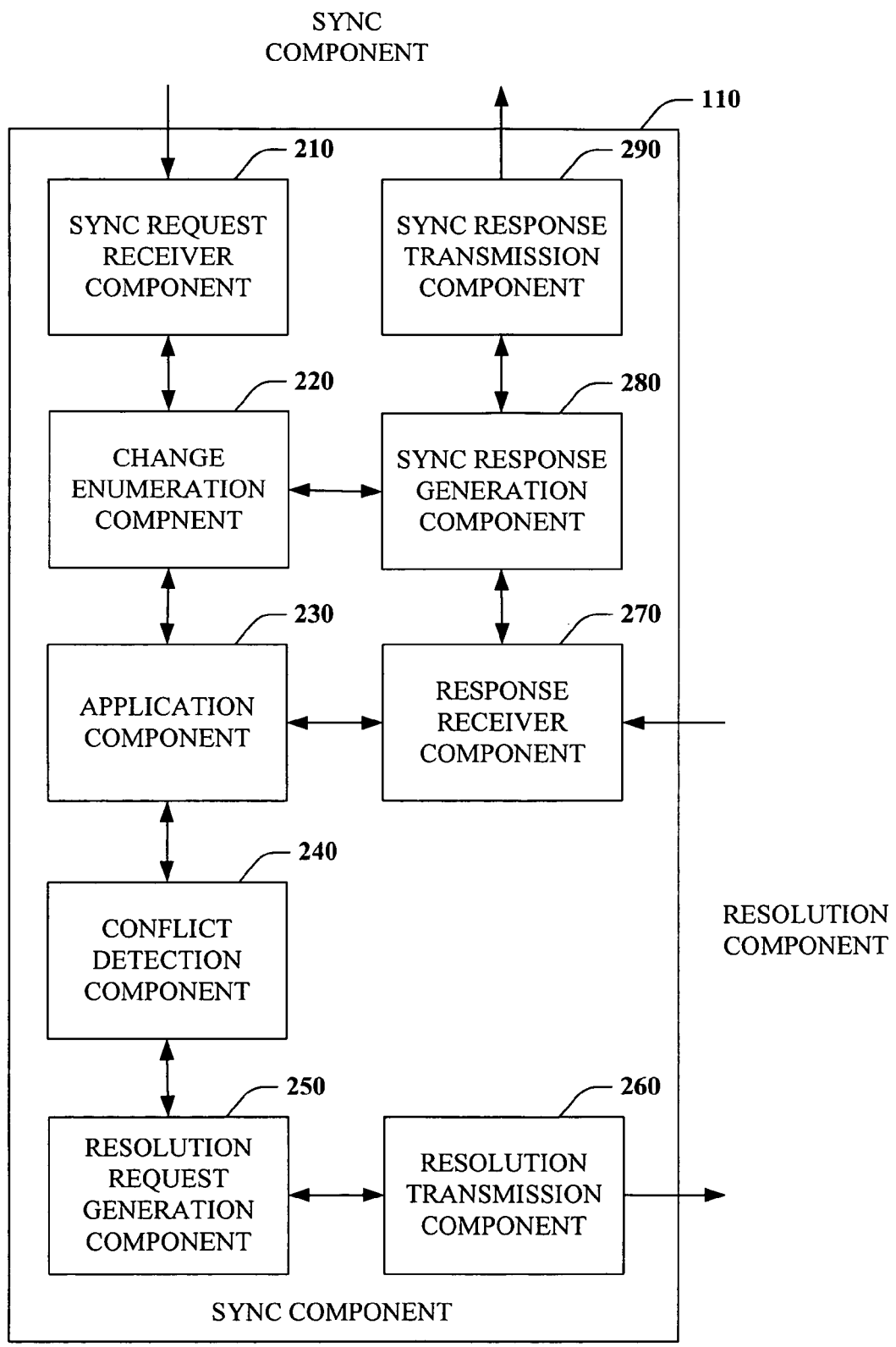
FIG. 2 is a block diagram of a synchronization component.

Turning to FIG. 2, a synchronization component 110 is illustrated. In accordance with an aspect of the subject innovation, several changes are needed to synchronization components to enable them to take advantage of separate conflict resolution. Synchronization component 110 includes a synchronization requested receiver component 210. The receiver component 210 is operable to receive synchronization requests from one or more other synchronization components 110. Such request can include the state of the requesting device, a set of changes, and/or other information. The receiver component 210 is communicatively coupled to the change enumeration component 220.

Change enumeration component 220 receives, retrieves or otherwise acquires the synchronization request from the request receiver component 210. Receipt of this request can initiate change enumeration with respect to the receiving component 110. In particular, the change enumeration component 220 can determine what the requesting component knows about its state. Based on that knowledge and the current state, the change enumeration component 220 can derive a set of changes it needs to inform the requesting component of to be synchronized.

Application component 230 receive, retrieves or otherwise acquires the set of changes generated by change enumeration component 220 and those provided via synchronization request receiver component 210. Subsequently, the application component 230 can proceed to apply or attempt to apply those changes.

Conflict detection component 240 is communicatively coupled to the application component 230. Conflict detection component 240 analyzes the changes to be made by the application component 230 and detects conflicts. If a conflict is detected by the conflict detection component 240, an indication of the conflict as well as other information can be provided to resolution request generation component 250.

The generation component 250 generates a resolution request including among other things the identity of the conflicting components, items, objects or the like. This packaged request is then provided to or retrieved by the resolution transmission component 260 that transmits the generated request to an independent conflict resolution component.

Response receiver component 270 is operable to receive a response to a request transmitted to a resolution component by resolution transmission component 260. The response can include a set of one or more of changes (e.g., add, delete, modify . . . ) that should be made to resolve the conflict. This received response can be transmitted upon receipt and/or by request to the application component 230. The application component can subsequently apply the set of changes. In addition to providing the changes to the application component 230, receiver component can also provide data to the synchronization response generation component 280.

The generation component 280 generates a response to a synchronization request received by component 210. The response can include a set of one or more changes that the requesting component should apply to synchronize with the subject synchronization component 110. Furthermore, the response can include an updated synchronization state that represents what knowledge the requesting component has with respect to the responding component and optionally other components. The set of changes can be generated based on input received or retrieved from the change enumeration component 220 and optionally the response receiver component when there is a conflict. After the response is generated, it can be provided to synchronization response transmission component 290 communicatively coupled thereto. Component 290 provides a mechanism to transmit received or retrieved responses to one or more synchronization components.

Figure 3:
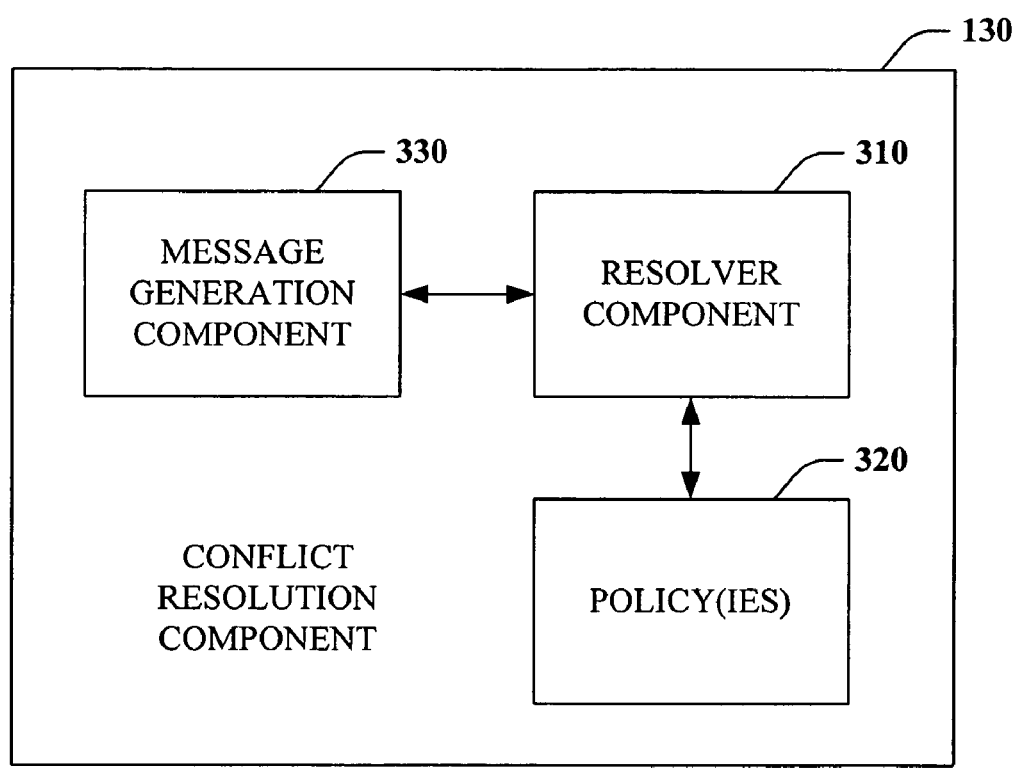
FIG. 3 is a block diagram of a conflict resolution component.

FIG. 3 illustrates a conflict resolution component 130 in accordance with an aspect of the subject innovation. Conflict resolution component 130 includes a resolver component 310 that resolves conflicts between synchronization components. The resolver component 310 can process received and/or retrieved data and make a decision concerning how a conflict should be handled. Exemplary input includes the identity of components with conflicting operations, the conflicting operations, and the versions or states associated with the components. Furthermore, the resolver component 310 can acquire data from policy(ies) component 320. Policy component 320 includes or is able to acquire one or more policies or protocols that can be executed by the resolver component 310 to resolve conflicts. For example, a simple policy may be that the component with the most recent or current version trumps a later version of such data. Resolver component 310 is also communicatively coupled to message generation component 330. Message generation component 330 produces a message or response to a resolution request that indicates what actions (e.g., add, delete, modify . . . ) need to be taken to resolve the conflict on a synchronization component. Message generation component 330 employs data provided by the resolver component 310 as well as other data provided to or retrieved by the conflict resolution component 120 to generate the message.

Figure 4:
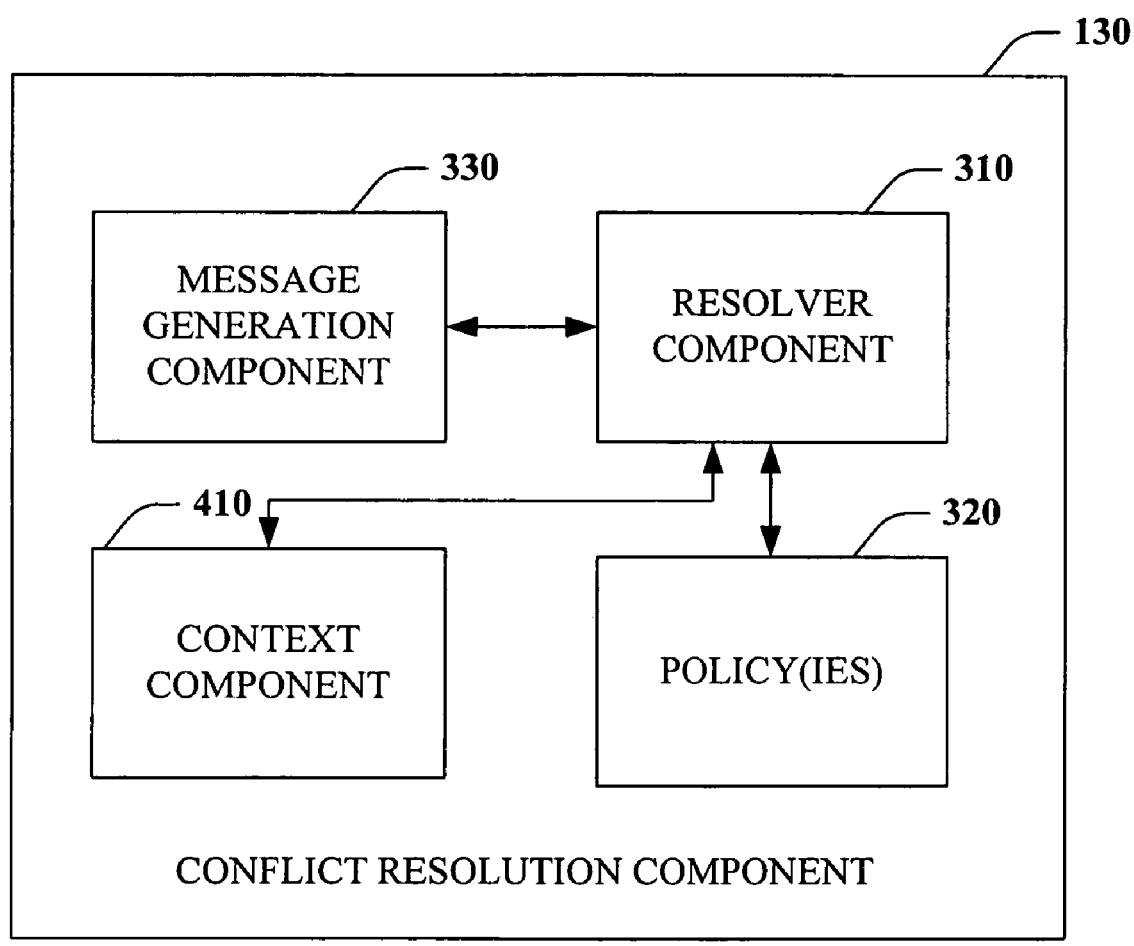
FIG. 4 is a block diagram of a conflict resolution component.

Turning to FIG. 4 a conflict resolution component 130 is depicted in accordance with an aspect of the subject innovation. Similar to the conflict resolution component of FIG. 3, the conflict component 130 includes resolver component 310, policy component 320 and a message generation component 330, as previously described. In brief, the resolver component 310 can receive and execute a policy provided by policy component 320 to resolve a conflict. The message generation component can then generate a synchronization response message that identifies actions that need to be taken by a component to resolve the conflict. Additionally, conflict component 130 includes a context component 410. Context component 410 receives, retrieves, or infers (as that term is defined herein) context information. Context information concerns events and information surrounding a conflict. Context information can include day, time, or any other information that can be utilized to resolve conflicts. The context component 410 is communicatively coupled to the resolver component 310 to enable transmission and receipt of such information to and by the resolver component 310. Furthermore, policies can be defined based on context information. Accordingly, component 310 can resolve conflicts based at least in part on context information thereby enabling much more dynamic and adaptive conflict resolution. As described supra, conflict resolution of calendar items can be dependent upon the time of day and day of the week, among other things.

Figure 5:
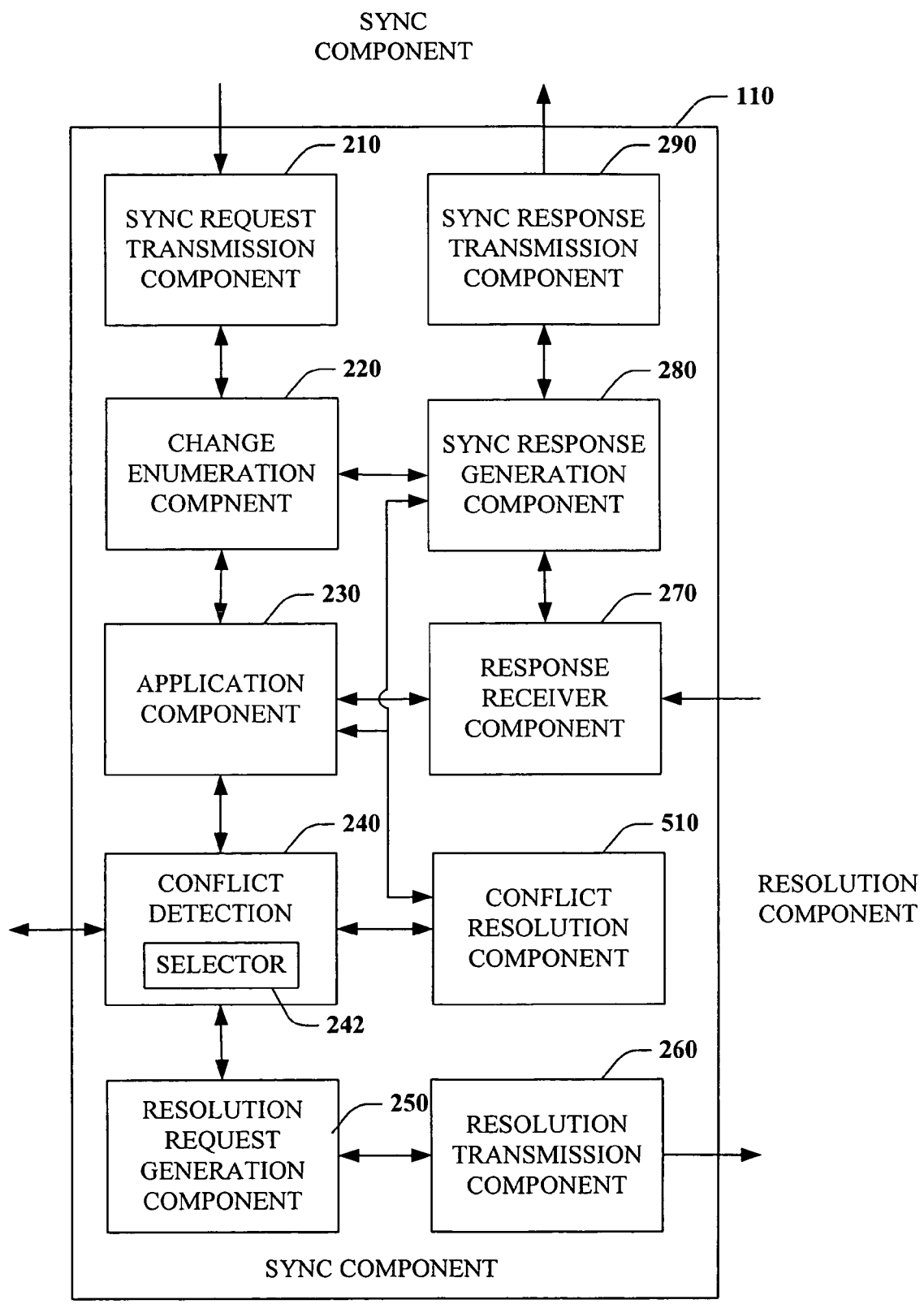
FIG. 5 is a block diagram of a synchronization component.

FIG. 5 depicts a synchronization component 110 in accordance with an aspect of the subject innovation. Synchronization component 110 includes similar components as provided and described with respect to FIG. 2. Additionally, synchronization component 110 can include a native conflict resolution component 510 communicatively coupled to the conflict detection component 240. Furthermore, conflict detection component can receive selection input to select employment of either native or external conflict resolution. If native conflict resolution is selected then the conflict detection component 240 can employ conflict resolution component 510. The conflict resolution response can then be communicated to application component 230 and synchronization response generation component 280. The application component 230 can then apply the changes to the synchronization component 110 and the response generation component 280 can generate a synchronization response to be transmitted to the requesting component. If the selection input to conflict detection component 230 corresponds to external resolution, the synchronization component 110 can function as described with respect to FIG. 2. In brief, a conflict resolution request can be generated and transmitted to the external conflict resolution component and a response to the request received providing information pertaining to how the conflict is resolved.

It should be noted that in addition to selecting native or external resolution based on an input, the conflict resolution component 240 could also determine on its own which resolution mechanism to utilize. For example, a resolution mechanism can be identified with a selector component 242 based on the type of conflict or the availability of external conflict resolution, amongst other things.

Figure 6:
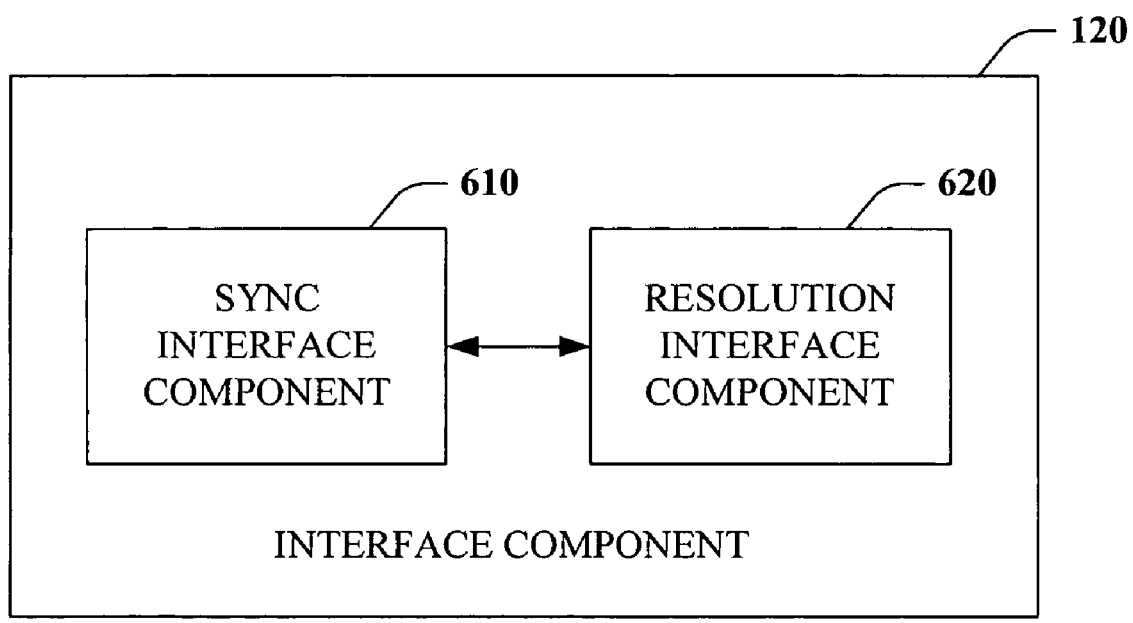
FIG. 6 is a block diagram of an interface component.

FIG. 6 illustrates an interface component 120. The interface component 120 can be but is not limited to an application-programming interface (API) in accordance with an aspect of the subject innovation. The interface component 120 includes a synchronization interface component 610 and a conflict resolution interface component 620. Synchronization interface component 610 can implement mechanisms such as functions and methods that can be called by synchronization components to facilitate communication with a conflict resolution component. Similarly, the interface component 120 can include mechanism like functions, methods and the like that a conflict resolution component can employ to enable communication with synchronization components. Thus, interface component 610 can interact with interface component 620 to facilitate translation of communication protocols. Furthermore, it should be appreciated that the interface component 120 can facilitate remote communication for example via COM, .net or the like.

Figure 7:
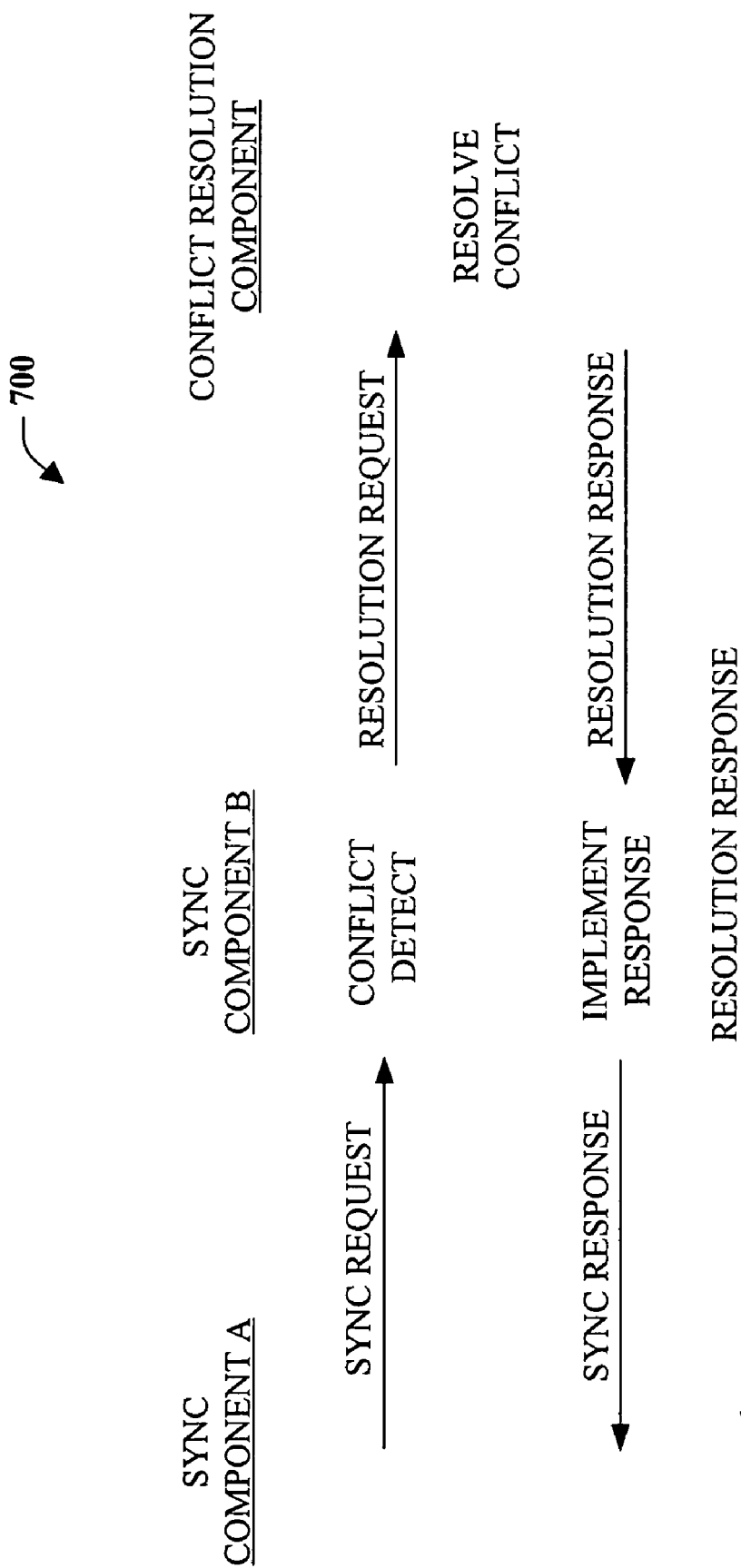
FIG. 7 is a diagram illustrating an exemplary scenario.

Turning to FIG. 7, an example 700 is illustrated to facilitate clarity and understanding of at least one aspect of the subject innovation. This example is not meant to limit the scope of the subject innovation to the scenario and interactions described, but rather to highlight particular interactions to aid understanding of only one exemplary embodiment. As illustrated, components A and B are synchronizing. To initiate the synchronization, synchronization component A transmits a synchronization request to synchronization component B. Upon receipt of the request, component B detects a conflict and forms a resolution request that is transmitted to the conflict resolution component. In other words, component B appeals to the resolution component. The conflict resolution component receives the resolution quests and makes a decision or resolves the conflict identified in the request. The conflict resolution component subsequently forms a resolution response that is communicated back to component B. Upon receipt of the response, the component B implements the response and forms a synchronization response including the resolution response. Subsequently, the synchronization response is communicated to the non-resolving component A, which can implement the response and thereby be synchronized with component B.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For instance, the context component 410 can employ such mechanisms to infer or predict context data. As another example, selector component 242 can employ intelligent means, mechanisms or the like to facilitate selection of an appropriate conflict resolution component given particular circumstances.

Figure 8:
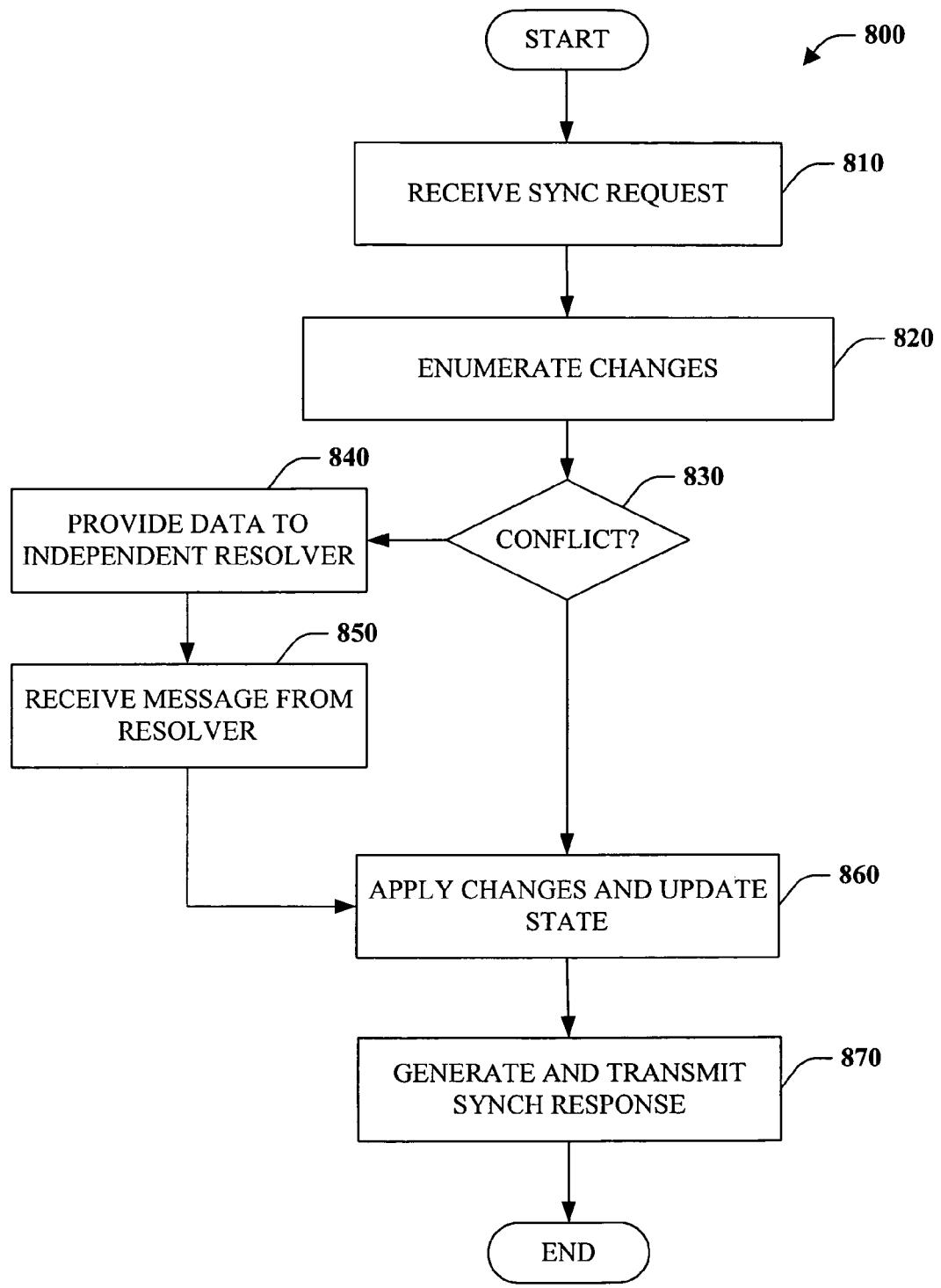
FIG. 8 is a flow chart diagram of a synchronization methodology.
Figure 9:
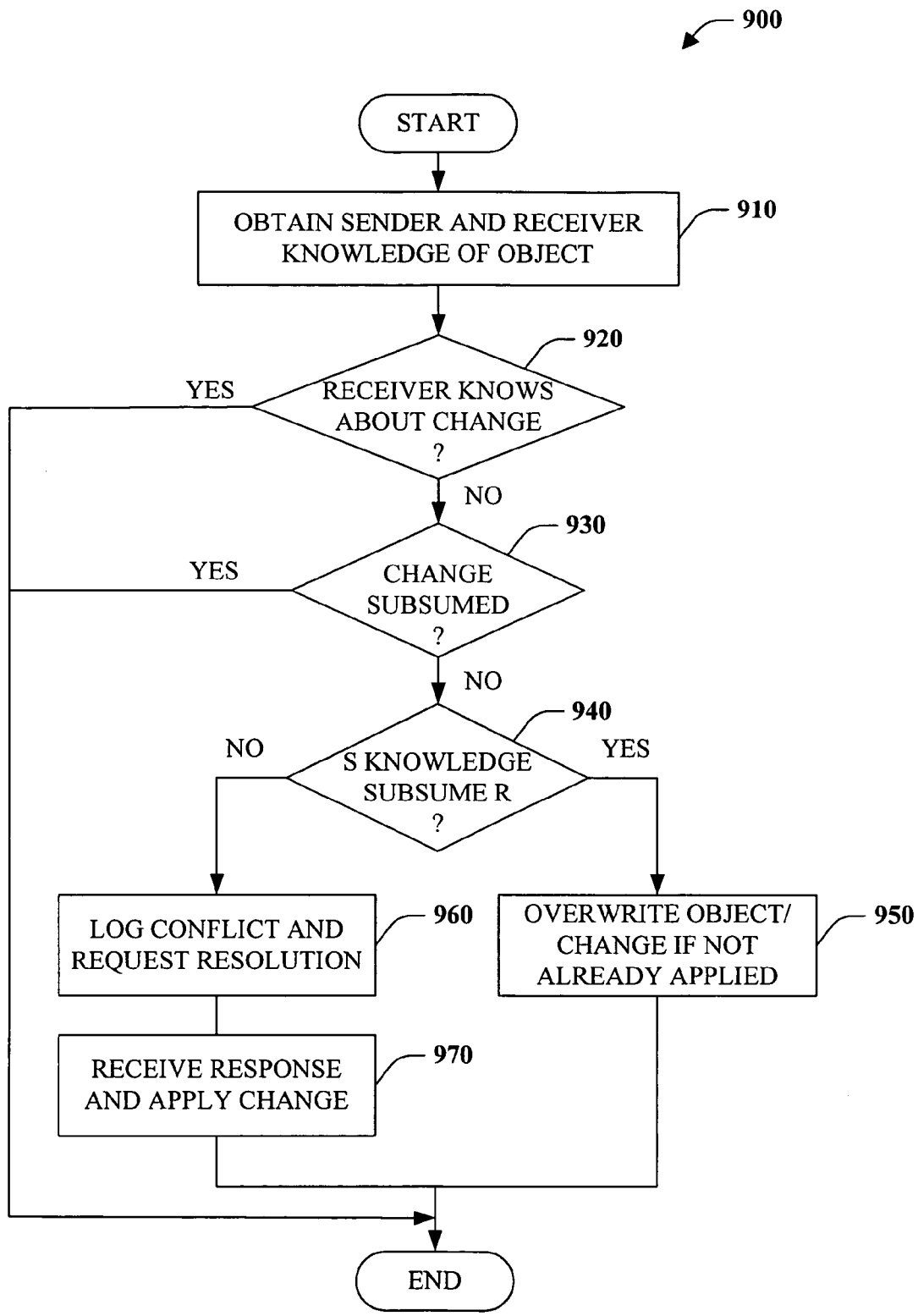
FIG. 9 is a flow chart diagram of a synchronization methodology.
Figure 10:
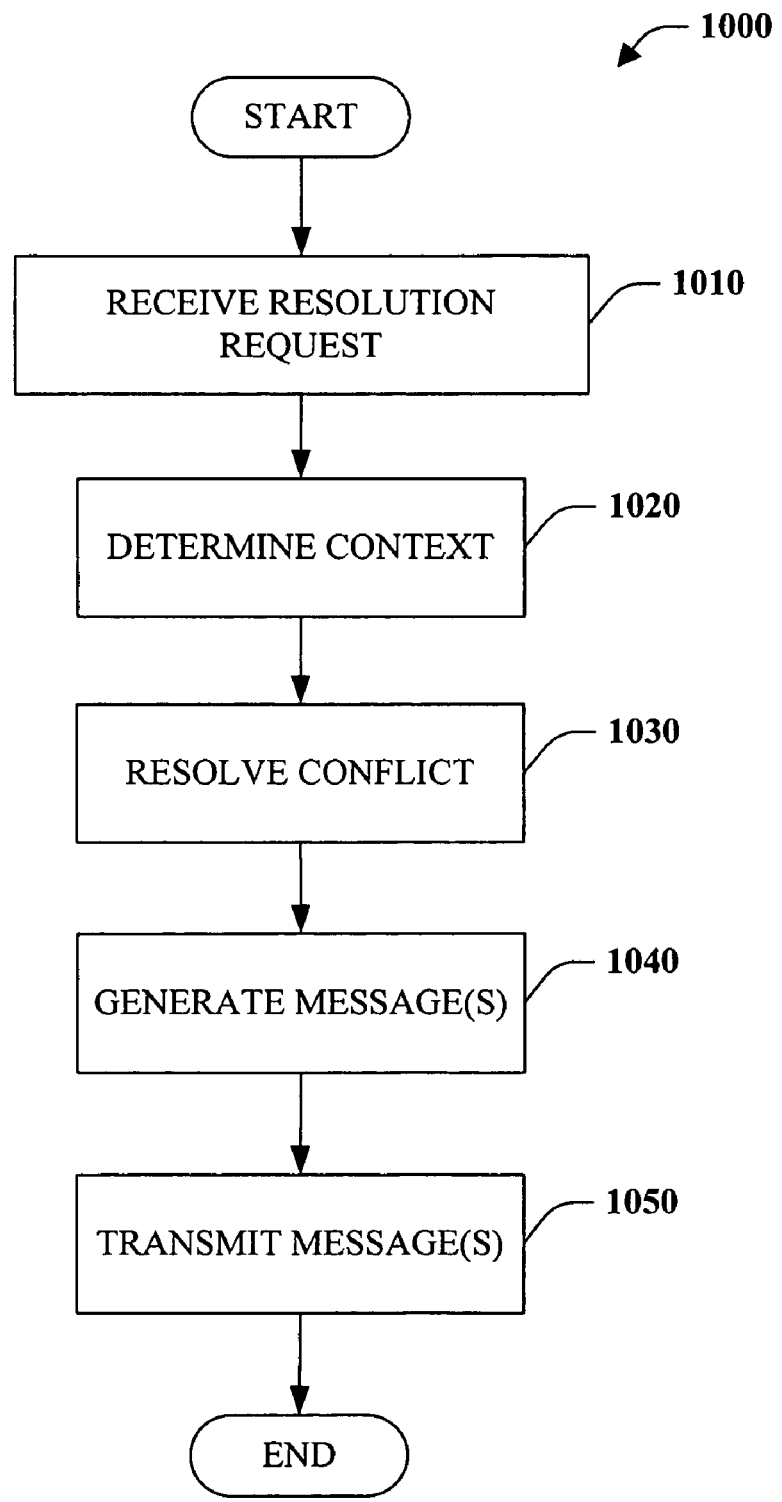
FIG. 10 is a flow chart diagram of a method of conflict resolution.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, a synchronization methodology 800 is illustrated in accordance with an aspect of the subject innovation. At reference numeral 810, a synchronization request is received from a synchronization component. The request can include a set of changes as well as synchronization state. At 820, changes can be enumerated for a request receiving synchronization component. These changes can include additions, deletions and/or modifications made since last synchronization. At 830, a determination is made as to whether there is a conflict between a set of changes received and the enumerated changes. If there is a conflict, then the method proceeds to 840. If there is not a conflict, the method continues at 860. At 840, data is provided to an independent resolution component or resolver. The data can correspond to a resolution request including for instance, conflicting components and state associated therewith. At 850, a message is received corresponding to a response to the resolution request. This message or resolution response can provide instructions pertaining to how modify a synchronization component. At reference 860, changes can be applied and knowledge or state can be updated to reflect the applied changes. At numeral 870, a synchronization response message can be generated and transmitted back to the requesting component. The synchronization response can include a set of one or more changes that need to be applied and a new state that can be utilized in subsequent synchronization sessions.

FIG. 9 illustrates a synchronization methodology 900 in accordance with an aspect of the subject invention. At reference numeral 910, sender and receiver knowledge or state is obtained pertaining to requested change to an object. At 920, a check is made as to whether the receiver knows about the change. If yes, the method terminates. If the receiver does not know about the change, the method can proceed to 930. At reference 930 a determination is made as to whether the sender's change is subsumed by any other pending changes to the object, for instance as a result of conflict logging. If yes, the change is ignored and the method terminates. If no, a determination is made concerning whether the sender's change conflicts with the receiver's version of the object, or any pending changes to the object. To this end, a check is made to determine whether the sender's knowledge of the object is subsumed by the receiver's knowledge at 940. If yes, then at 950 the object/change is overwritten if not already applied. If no, there is a conflict. At reference numeral 960, the conflict is logged and resolution is requested from an external or native conflict resolution component. A response to the request is received and applied or implemented. Subsequently, the method can terminate and/or another object processed.

Turning to FIG. 10, a conflict resolution method 1000 is depicted in accordance with an aspect of the subject innovation. At reference numeral 1010, a resolution request is received. The resolution request can include data identifying a conflict between one or more components, such as but not limited to component or entity identification and state information. At 1020, context information is received, retrieved, or otherwise obtained, inferred, or predicted. The identified conflict is resolved at 1030, for instance in accordance with a conflict policy or protocol. At 1040, a resolution response message is generated. The message can include a set of one or more changes that should be implemented in response to the conflict. For example, if object A and B conflict a determination can be made that object A has precedence and accordingly the generated message can indicate that object A should be added. At 1050, the generated message is transmitted back to the requesting component.

Figure 11:
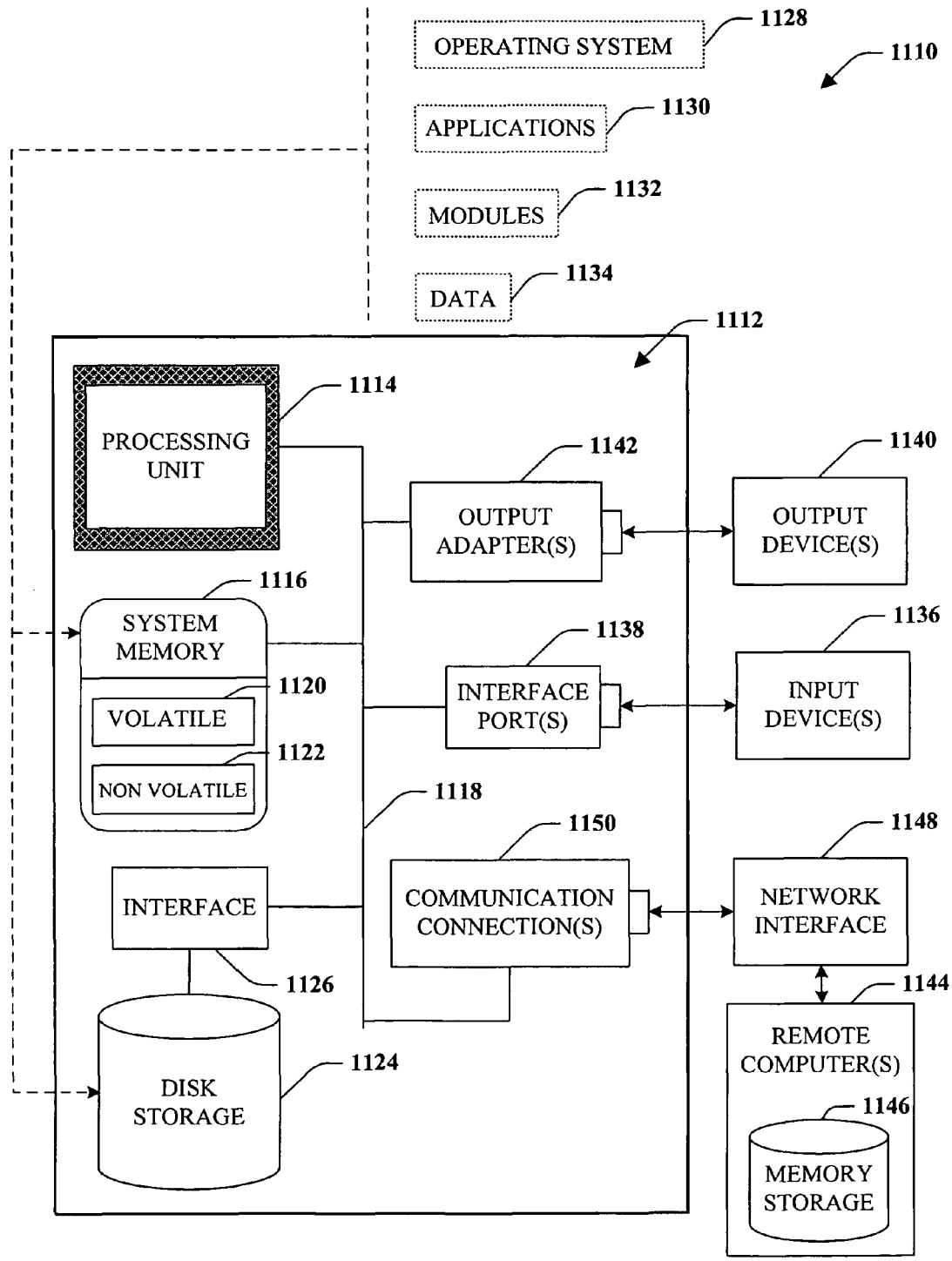
FIG. 11 is a schematic block diagram illustrating a suitable operating environment for aspects of the subject innovation.
Figure 12:
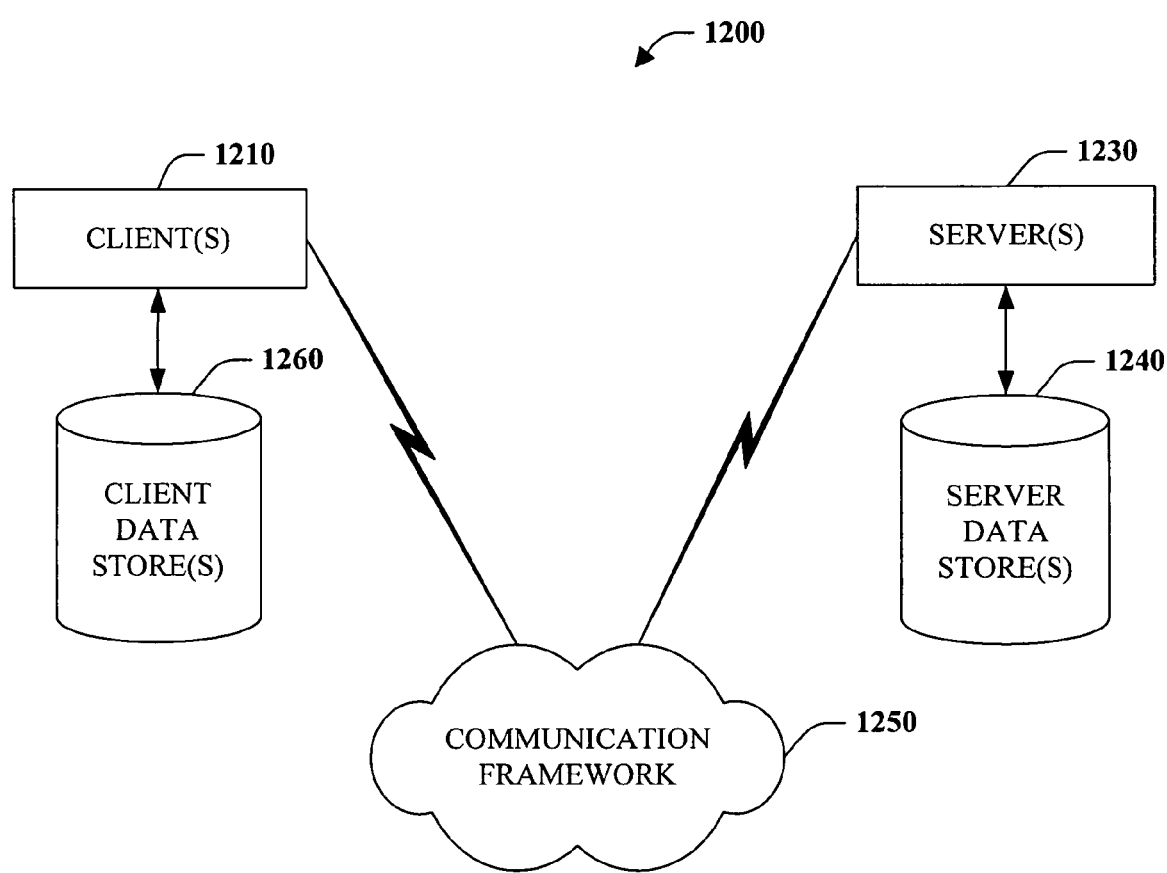
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1116, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A conflict resolution system comprising the following computer-implemented components:
 a processor for executing on a computer executable instruction;
 a memory having stored therein computer executable instruction;
 a first synchronization component communicatively coupled to a second synchronization component, wherein the first synchronization component is configured to detect a synchronization conflict associated with changes in the first and second synchronization components, and configured to generate and communicate a conflict resolution request for independent conflict resolution of the synchronization conflict in response to detection of the synchronization conflict;
 an interface component that facilitates receipt of the conflict resolution request from the first synchronization component;
 a conflict resolution component that resolves the synchronization conflict identified in the conflict resolution request and that generates a synchronization response message for communication to the first synchronization component, wherein the synchronization response message identifies changes to be implemented by at least one of the first and second synchronization components for resolving the synchronization conflict, and wherein the conflict resolution component is independent of the first and second synchronization components; and
 wherein the conflict resolution request includes identification of conflicting components and state information thereof.

2. The system of claim 1, wherein the conflict resolution component resolves requests based on a resolution policy independent of conflicting components.

3. The system of claim 2, wherein the conflict resolution component includes a context component that obtains context information from the first synchronization component to facilitate policy application.

4. The system of claim 1, wherein the conflict resolution component includes a message generation component that generates the synchronization response message for responding to the request.

5. The system of claim 4, wherein the generated response is communicated to the first synchronization component via the interface component.

6. The system of claim 4, wherein the response includes instructions on how to implement resolution on a synchronization component.

7. The system of claim 4, wherein the generated response provides information that pertains to the resolution.

8. The system of claim 4, wherein the first and second synchronization components each include a conflict detection component to detect conflicts in data to be synchronized.

9. A synchronization methodology comprising the following computer implemented acts:
 detecting a synchronization conflict associated with changes in a first and second item respectively resident on at least a first and second component, wherein the first and second components are communicatively coupled together;
 generating a conflict resolution request that identifies a conflict associated with the synchronization conflict;
 communicating the request to a remote entity independent of the at least first and second components;
 at the remote entity:
  resolving the conflict identified in the request; and
  generating a synchronization response message for communication to the first component, the synchronization response message identifying a change to be implemented by at least one of the first and second components for resolving the synchronization conflict; and
 at the first component:
  receiving the synchronization response message; and
  communicating the identified change to the second component;
 wherein the conflict resolution request includes identification of conflicting components and state information thereof.

10. The method of claim 9, further comprising:
 receiving a synchronization request including changes to be applied from the first component; and
 enumerating changes associated with the second component since last synchronization of the first and second components.

11. The method of claim 10, further comprising receiving a resolution response from the remote entity.

12. The method of claim 11, further comprising applying changes provided in the response to the second item.

13. A synchronization system comprising:
 a processor for executing on a computer executable instruction;
 a memory having stored therein computer executable instruction;
 a computer-implemented means for detecting a synchronization conflict associated with changes in first and second devices;
 a computer-implemented means for generating a conflict resolution request in response to detection of the synchronization conflict, wherein the first and second devices are communicatively coupled together;
 a computer-implemented means for transmitting the conflict request to an independent resolver remote from the first and second devices for independent conflict resolution of the synchronization conflict;
 a computer-implemented means for receiving the conflict resolution request; a computer-implemented means for resolving, at the independent resolver, the synchronization conflict and for generating, at the independent resolver, a synchronization response message identifying changes to be implemented by at least one of the first and second devices for resolving the synchronization conflict;
 a computer-implemented means for receiving, at one of the first and second devices, a the synchronization response message from the independent resolver, the synchronization response message identifying changes to be implemented by at least one of the first and second devices for resolving the synchronization conflict;
 a computer-implemented means for communicating the information identifying the changes to another of the first and second devices; and a computer-implemented means for implementing the response with respect to one of the first and second devices;

wherein the conflict resolution request includes identification of conflicting components and state information thereof.

14. The system of claim 13, further comprising a computer-implemented means for forming a synchronization response for communication to the another of the first and second devices.

* * * * *